Feb. 21, 1967  A. R. MICCIOLI ET AL  3,305,867
ANTENNA ARRAY SYSTEM
Filed Nov. 5, 1963  4 Sheets-Sheet 3

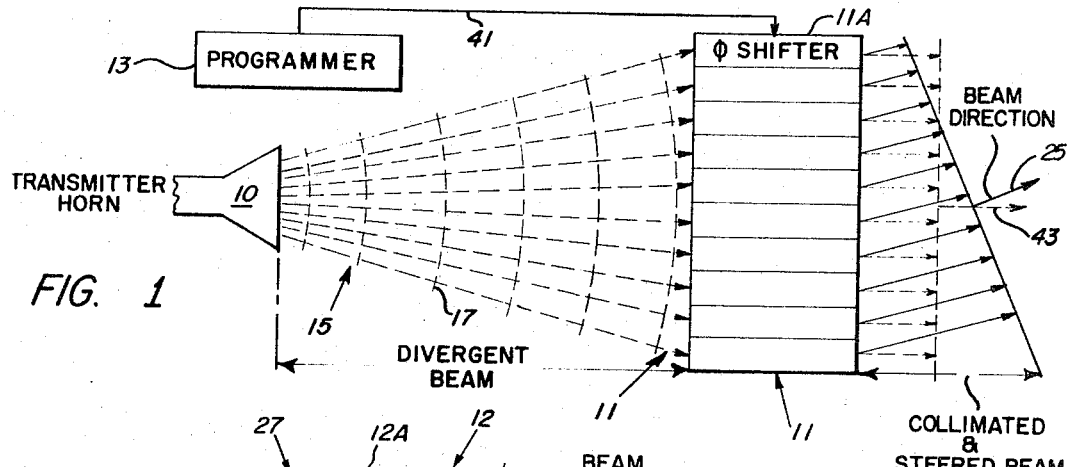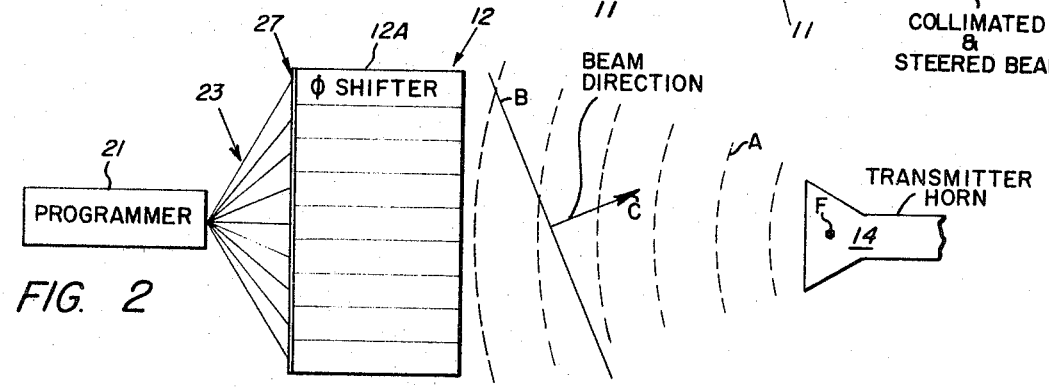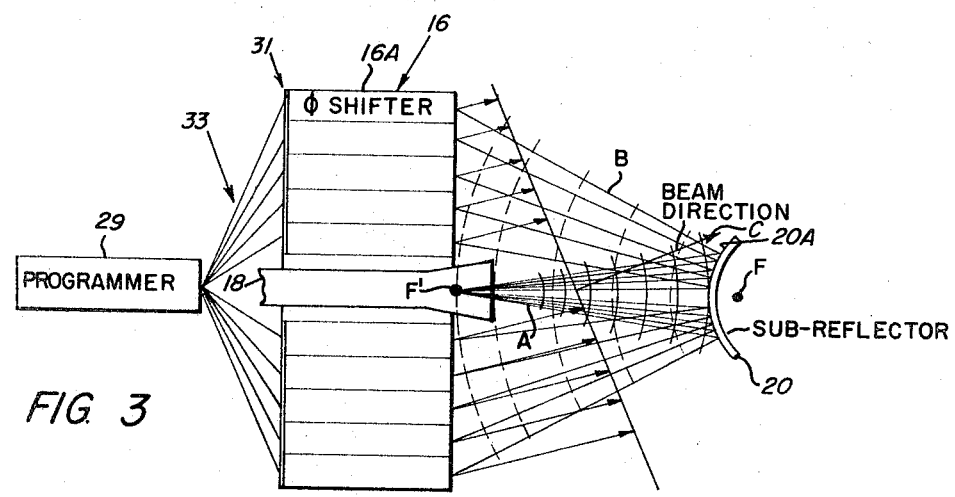

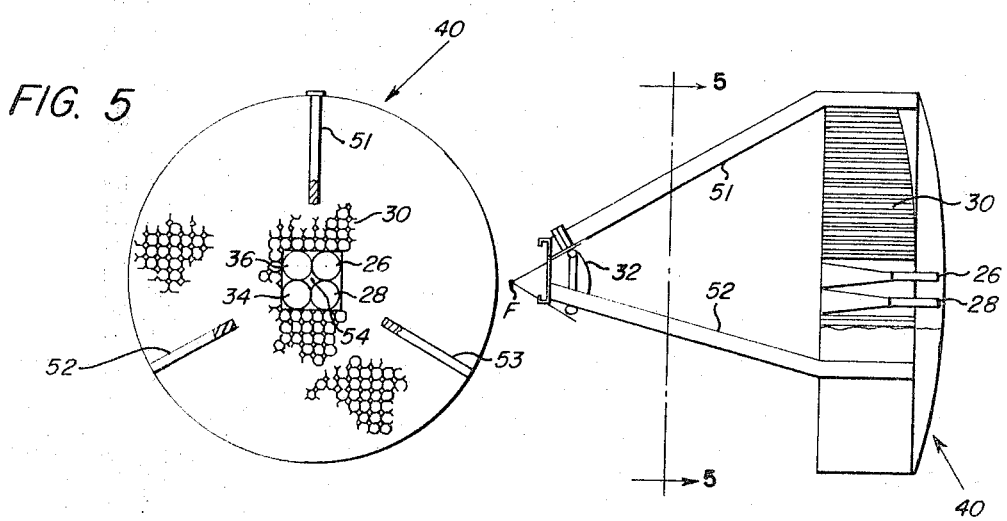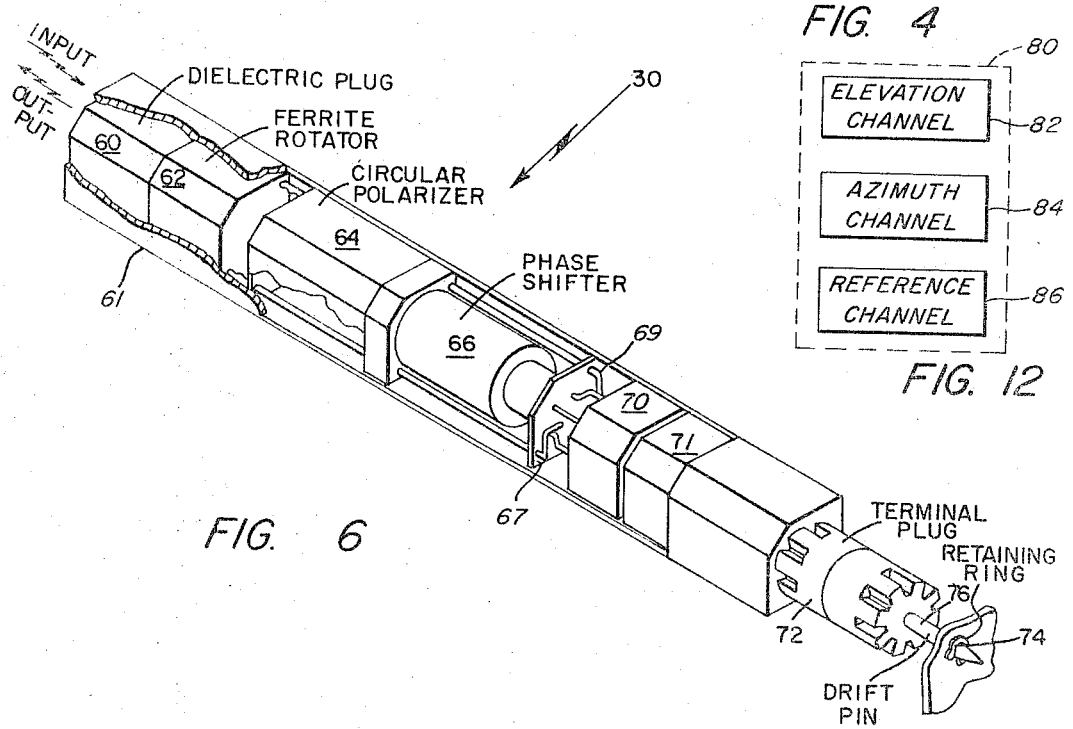

EQUIVALENT CONJUGATE
ARM TERMINATING CIRCUIT
[BACK BIASED DIODE]

EQUIVALENT CONJUGATE
ARM TERMINATING CIRCUIT
[FORWARD BIASED DIODE]

INVENTORS
ALDO R. MICCIOLI
DONALD H. ARCHER

BY Leo R. Reynolds
AGENT

INVENTORS
ALDO R. MICCIOLI
DONALD H. ARCHER

BY Leo R. Reynolds

AGENT

United States Patent Office

3,305,867
Patented Feb. 21, 1967

3,305,867
ANTENNA ARRAY SYSTEM
Aldo R. Miccioli, Acton, Mass., and Donald H. Archer, Santa Barbara, Calif., assignors to Raytheon Company, Lexington, Mass., a corporation of Delaware
Filed Nov. 5, 1963, Ser. No. 322,008
8 Claims. (Cl. 343—113)

This invention pertains to an antenna array system and more particularly to an optically fed antenna array.

An antenna array consists of a plurality of radiant elements suitably spaced from one another. The radiant elements are normally frequency scanned and/or phase controlled in order to provide an electrically steered radiating beam. The frequency scanned system comprises an array of radiating elements in which the relative phase of the radiation from each element is controlled by the frequency of the propagated signal. The frequency scanned system has the disadvantage that beam position is dependent upon the frequency of the propagated signal. Accordingly, where, for example, the antenna array of a frequency scanned system is used as a target tracking device, it would be impossible to assign pre-set frequencies to individual targets in a multiple target tracking situation. The phase controlled system, while eliminating the beam position frequency dependence problem, creates a different problem of structural complexity. In the phase controlled systems of the past, each individual radiant element is controlled in phase by a phase shifter. The phase shifters are, in turn, driven by a central computer to establish the proper radiated phase front for a given desired beam direction. The radiant elements of the antenna are fed by a complex corporate structure type network of directional couplers physically coupled to individual radiant elements. The complexity of the feed network contributes to the high cost and heavy weight of the system.

Accordingly, it is an object of the present invention to provide an improved antenna array system having beam positioning control independent of frequency and a simplified and relatively lightweight and hence relatively low cost antenna feed network.

In the apparatus of the present invention an array of antenna elements, preferably passive elements, is optically fed from one or more radiant sources. Power is propagated from the one or more radiant sources to an array of passive elements disposed in spaced-apart relationship from the radiant sources. Each passive element includes a phase shifting device such as a ferrite phase shifter, mechanical plunger or diode switching apparatus for changing the effective electrical length of the element. Uncollimated and unsteered power from said radiant source incident upon an individual element passes through the phase shifting device and is radiated therefrom with a phase relationship determined by the setting of the individual phase shifters so as to provide the desired collimated and steered radiated phase front. Since the device is reciprocal, energy reflected from distant objects and impinging on the array in the form of substantially parallel rays will be focused by the array in a direction corresponding to the setting of the individual phase shifters.

As contrasted to the aforesaid prior art electronic scanning systems the optically-fed system of the invention has the following advantages. Array beam forming is simple and straightforward. The thousands of transmission lines required by the prior art conventional arrays to connect each receiving channel to the array elements and their attendant phase equalization problems are eliminated. In the apparatus of the present invention, the transmitter and antenna are physically and conceptually separate. The antenna can be designed to produce the required antenna beamwidth on transmit and receive without the necessity for the cost and complexity attendant to the use of power amplifiers at each element. The transmitter can be designed to provide the required peak and average power in the most economical way possible. Generally this involves utilizing a small number of transmitting tubes. The transmitter output can be optically fed to the array through a single pipe feed or a few pipes. The array structure is much lighter with the transmitter function located elsewhere. Consequently, because of the lighter structure the array can be readily mounted on a single or two-axis rotatable structure to provide coarse positioning if required. When so mounted a single antenna face can cover a full hemisphere and cost savings or redundant coverage is obtainable.

Furthermore, by using bilateral phase shifting devices the same array can be used for both transmission and reception. Duplexing of the array may be accomplished in the conventional manner by employing a single radiant horn and a switching mechanism to switch the horn to a receive mode. Furthermore, monopulse tracking beams may be formed with ease.

Other objects and advantages of this invention will become apparent from the following specification taken in connection with the accompanying drawings wherein:

FIG. 1 shows in diagrammatic form a lens type optically fed array system of the invention;

FIG. 2 shows in diagrammatic form a reflector type optically fed array system of the invention;

FIG. 3 shows a Cassegrainian type optically fed array system of the invention;

FIG. 4 is a partially cut-away side view of a two dimensional Cassegrainian type optically fed array system of the invention including four horns adapted for monopulse operation;

FIG. 5 is a view of the embodiment of FIG. 4 taken substantially along the line 5—5 of FIG. 4;

FIG. 6 shows the details of one of the ferrite passive phase shifter elements of the optically fed array system of FIG. 5;

Figure 7:
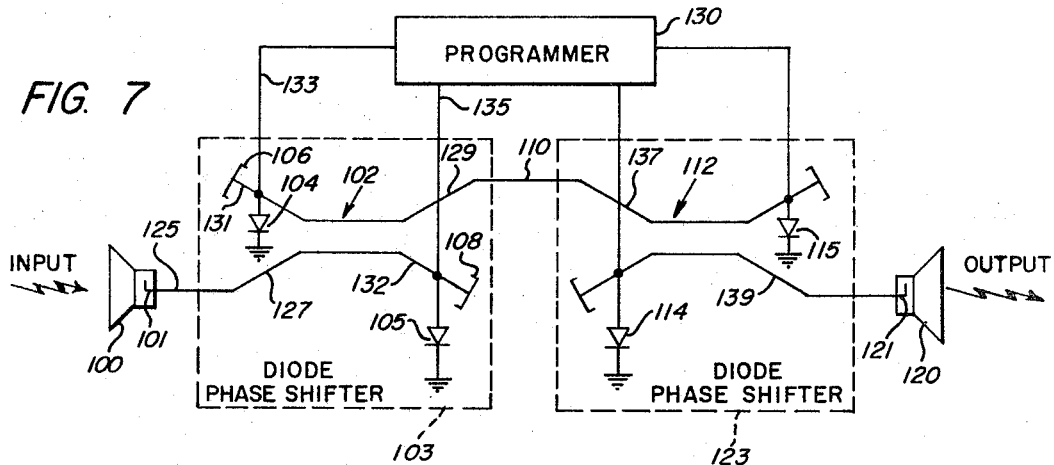
FIG. 7 shows in schematic form an alternate embodiment of a bilateral passive phase shifter element of the invention which utilizes diode switching to effectuate a phase shift.

Referring specifically to FIG. 1 there is shown a transmitter feed horn 10 disposed in spaced-apart relation from an array 11 comprised of a plurality of passive elements one of which is designated 11A adapted to receive radiation emanating from said horn. Each passive element is comprised of a device whose electrical length may be varied thereby producing a phase shift of the radiation received by said element from said horn. Examples of devices for providing a variable electrical length are ferrite phase shifters, diode phase shifters and mechanical plungers. The former two devices will be subsequently described in detail in connection with FIGS. 6 and 7.

The energy propagated from the horn 10 emerges as an uncollimated or divergent beam indicated by the plurality of divergent rays 15 having a spherical wavefront 17. Collimation and steering of the optically fed beam from horn 10 takes place within the plurality of phase shifting elements of the array 11 and results from the programmed introduction of a predetermined amount of phase shift to the energy received by each of the passive elements. For example, where a well known ferrite phase shifter is utilized for the passive elements one of which is designated 11A of the array 11, energy incident upon an individual element is radiated from the opposite end with a phase determined by the current through the ferrite solenoid coil. Initially, each ferrite phase shifter is excited with sufficient current to produce a phase shift which will collimate the divergent beam emanating from horn 10. The collimated unsteered beam is indicated in FIG. 1 by the numeral 43. Beam steering is accomplished by programming the requisite control currents needed to establish a phase shift across the array which will tilt the beam the desired angle in the direction, for example, indicated by numeral 25. Each of the currents are generated in programmer 13 which may comprise for example a digital computer which determines the proper phase shift for each element for any desired beam position and supplies current of the appropriate value to each of the solenoid coils so as to change the phase of the incident energy the desired amount. The requisite currents are coupled by way of cable 41 to the control coil of the individual ferrite phase shifters of the array.

It is to be understood that some of the structural elements not necessary for a description of the invention but apparent to those skilled in the art have been omitted in the drawing of FIG. 1 for simplification. For example, it is apparent that the transmitter horn 10 of FIG. 1 will be connected to a suitable energy source such as a radar transmitter or the like. It should also be understood that any number of horns may be used to optically feed the array 11 of FIG. 1. It is also to be understood that because of the inherent reciprocity of the system of FIG. 1, the system embodied therein may function in the reverse manner, that is, as a receiver. When so operated, the phase shifting elements are programmed so as to sequentially focus or converge energy emanating from different directions in space upon the horn 10 which now acts as a receiver to accumulate the energy so focused. Generally speaking, therefore, the horn 10 may be looked upon as an antenna which either accumulates or radiates energy depending on the mode of operation.

FIG. 2 illustrates a reflector type optically fed array system of the invention which utilizes reentrant type phase shifters for the passive elements one of which is designated 12A of the array 12. In the embodiment of FIG. 2 a radiant element such as transmitter horn 14 is preferably disposed at the focal point F of an electrically equivalent parabolic reflector formed by the variable electrical path lengths of the individual phase shifters of antenna array 12. Although a parabolic shape is chosen herein for ease in explanation, it is to be understood that any appropriate surface may be chosen depending on the location of the horn 14 as long as the array elements are initially set so as to delay or advance the path length of the individual packets of energy or rays incident upon each passive element from radiant element 14 so that the path length of each ray is equal thereby to form a collimated or plane wave front of the beam as it emerges from the array. In the case of a parabolic reflector herein described, the phase shifters are initially set, as by adjusting the coil current in the case of ferrite phase shifters, so as to provide an effective electrical length across the surface of the array equivalent to that of a parabolic surface. Coil current is provided by way of leads 23 from programmer 21 in the manner described in connection with FIG. 1. Power or energy from transmitter horn 14 is radiated toward the array 12 in a divergent beam designated A in FIG. 2. Each element of the array comprises, for example, a waveguide channel whose electrical length is controlled by, for example, a ferrite phase shifter. The waveguide channels are terminated at end 27 in a short circuit. Accordingly, power incident upon an element enters the waveguide channel, passes through the phase shifter, is reflected from the short circuit, passes through the phase shifter again and is reradiated with a phase determined by the current setting of the ferrite phase shifter. Since the electrical length of each of the passive elements of the array 12 is initially established so as to form an equivalent parabolic surface, the divergent rays emanating from transmitter horn 14 are collimated upon passage through the individual elements of the array and thereby converted into a plane wave front of uniform phase designated by the letter B. An additional amount of phase shift is imposed upon the divergent beam emanating from transmitter horn 14 in the manner described in connection with FIG. 1 by programming appropriate currents through the coils of the individual ferrite phase shifters of the array 12 so as to steer the beam B in any desired direction. It is to be noted that the apparatus of FIG. 2, and in particular the array 12 of FIG. 2, may be utilized as either a transmitting array or a receiving array since energy emanating from, for example, direction C will be received by the array 12, phase shifted and reflected back towards the transmitter horn 14. With apporprise receiver duplexing apparatus, not shown, the transmitter horn 14 may then function as a receiver element. It is further noted that in the apparatus of FIG. 2 as in the apparatus of FIG. 1 diode phase shifters or mechanical plungers may be utilized in place of the aforementioned ferrite phase shifters to achieve a variable electric length. The apparatus shown in FIG. 2 provides an advantage over that of FIG. 1 in that less ferrite material is required in the apparatus of FIG. 2 since energy is passed through the ferrite phase shifter twice so that for a given length of ferrite material twice the amount of phase shift is realized in the apparatus of FIG. 2 as compared to that of FIG. 1. This advantage is achieved, however, at the expense of some aperture blocking resulting from the placement of the transmitter horn 14 in front of the aperture of the antenna array 12. However, as previously noted it is not necessary that the transmitter horn be placed at the focal point of the array. Instead, the horn may be off-set and path lengths equalized by suitable phase shifting within the passive elements. Another drawback to the apparatus of FIG. 2 results, however, from the placement of the transmitter horn in front of the array 12. Frontal placement necessitates a relatively long transmission line between the transmitter (not shown) and the transmitter horn since the transmitter is normally located behind the array to minimize aperture blocking. Any increase in transmission line length tends to introduce impedance mismatching in the transmitter horn feed.

The aforementioned drawbacks to the apparatus of FIG. 2 are obviated by the embodiment of FIG. 3 now to be described. In the apparatus of FIG. 3 the individual phase shifters one of which is designated 16A of the antenna array 16 are initially set by programmer 29 in the manner described in connection with FIG. 2 to provide the electrical equivalent of a parabolic reflector surface. The transmitter horn or feed 18 is located near the vertex of the equivalent parabolic reflector. A subreflector 20, having a hyperbolic surface 20A, is located in front of the parabolic reflector between the vertex and the virtual focal point F of the parabola formed by the equivalent parabolic surface. Energy propagated from transmitter horn 18 emerges as a divergent beam of rays A which rays are reflected from subreflector 20 toward the individual phase shifter elements of the array 16. The hyperbolic subreflector 20 images the transmitter horn 18 so that the horn appears as a virtual image at the focal point F of the parabola formed by the array 16. Accordingly, the reflected energy from the subreflector 20 designated by the plurality of rays B is focused on the equivalent parabolic reflector formed by the array 16. Energy incident on each element of the array passes through the phase shifter of each element, is reflected from the short circuit at the far end 31 of each element, passes through the phase shifter again and is reradiated, for example, with a phase front in the beam direction C determined by the current setting provided by programmer 29 to the individual phase shifters. Programmer 29 provides current to the individual phase shifters over leads 33. Accordingly, the divergent beam emanating from transmitter horn 18 is collimated and steered by the array 16. The apparatus of FIG. 3, in addition to the aforementioned advantage of minimizing the length of ferrite material required to achieve a given phase shift, reduces the axial length dimension of the antenna system, permits greater flexibility in the design of the feed system and eliminates the need for long transmission lines.

This completes the generalized description of several embodiments of the invention. Before proceeding to certain novel details of particular embodiments of the invention, it is appropriate to note that the devices thus far described offer a distinct advantage over prior antenna array systems in that amplitude tapering of the beam may be accomplished in the well known manner by merely selecting suitable values of the feed horn dimensions. In the prior art phased arrays, tapering had to be obtained by introducing db couplers of varying attenuation across the array thus necessitating many different coupler designs. It is further noted that beam broadening and forming may be readily accomplished by the introduction of suitable phase shift at the individual elements of the array.

The particular structural details of the Cassegrainian type optically fed antenna shown schematically in FIG. 3 are shown in FIGS. 4–6. In FIGS. 4 and 5 there is shown a plurality of horns 26, 28, 34 and 36 symmetrically arranged about the focal point of an electrically equivalent parabolic surface formed by the individual passive elements 30 or array 40. Subreflector 32 is located adjacent horns 26, 28, 34 and 36 in the path of energy propagated therefrom. Energy propagated from the horns emerges as a divergent beam of rays which are reflected from the hyperbolic surface of subreflector 32 towards the individual phase shifter one of which is designated elements 30 of array 40. The subreflector 32 is suspended from three arms 51, 52 and 53 as shown. The hyperbolic subreflector 32 images the transmitter horns so that the horns appear as virtual images at the focal point F of the equivalent parabola formed by the array 40. Accordingly, reflected energy from the subreflector 32 is focused upon the parabolic reflector formed by the array 40. Energy incident on each element of the array passes through the phase shifter of each element, is reflected from a short circuit at the far end of each element, passes through the phase shifter again and is reradiated with a phase determined by the setting of the individual phase shifters. A programmer, similar to the programmer of FIGS. 1–3, not shown, provides current of a predetermined value to the individual phase shifting elements. The array 40 comprises a planar array of reentrant waveguides in an egg-crate structure. Each waveguide element contains a ferrite phase shifter. Since a planar array face is required to secure linearly independent beam scanning in elevation and azimuth planes, the lengths of the array elements are adjusted to equalize ray path lengths for beam collimation. This adjustment may be provided by establishing the proper path length by variations in the initially applied solenoid current of each phase shifter. Alternatively, dielectric plugs of various lengths such as the dielectric plug 60 of FIG. 6 may be inserted in each waveguide element to provide the requisite equalization of path lengths.

In a monopulse system, the four horns 26, 28, 34 and 36 are energized simultaneously so as to form a four beam monopulse tracking system when connected to a suitable receiver, depicted in FIG. 12. The receiver 80 measures either the relative phase or the relative amplitude of the echo pulse received in each beam. Suitable receivers are described in detail in the texts "Introduction to Monopulse," McGraw-Hill Book Co. Inc., New York, 1959 by S. R. Rhodes and, "Monopulse Radar," I.R.E. Convention Record, vol. 3 pt. 8, pp. 132–134, 1955, and in the United States Patent 3,090,952 to J. H. Kuck issued May 21, 1963. Briefly, the monopulse receiver 80 comprises an elevation receiver channel 82 in which the output of horns 34 and 28 are summed and the sum subtracted from the sum of the output of horns 36 and 26; an azimuth receiver channel 84 in which the output of horns 26 and 28 are summed and the sum subtracted from the sum of the output of horns 34 and 36 and a reference channel 86 in which the output of all four horns are added. The reference channel 86 provides either a phase and/or amplitude reference with respect to which the receiver channel signals are compared in order to derive error signals indicative of the echo producing bodies deviation from the projection of the center 54 of the cluster formed by the four horns, the projection being the tracking axis of the antenna.

A specific one of the phase shift elements 30 of FIGS. 4 and 5 is shown in detail in FIG. 6. In the apparatus of FIG. 6 energy incident from subreflector 32 is received at the input end of passive element 30. Passive element 30 is comprised of a square waveguide 61 enclosing a reentrant phase shifter which includes the dielectric plug 60, a ferrite rotator 62, a circular polarizer 64, phase shifter 66 and reflector plate 67 arranged in that order progressing from the front end of the waveguide. The operation of a reentrant phase shifter is described in detail in United States Patent No. 3,100,287 entitled "Electrical Shifters Utilizing Variable Delay Imparted to Circularly Polarized Electric Waves By Variably Magnetized Ferrite Material" issued to Scharfman et al., August 6, 1963.

Briefly, the reentrant phase shifter operates in the following manner. Phase shifter 66 includes a solenoid coil, not shown, which is energized by leads 69 connected to an external current source by way of terminal plug 72. Terminal plug 72 is shown spaced from phase shifter 66 to provide room for additional components in compartments 70 and 71 not forming a part of the present invention. Retaining ring 74 encircles and supports drift pin 76. The magnetic field created by current flow through the solenoid induces the ferrite loaded circular waveguide of the phase shifter 66 to exhibit a large degree of microwave permeability to a microwave signal circularly polarized in the same direction as the current through the solenoid. The variable permeability produces a phase shift by changing the phase velocity of the signal passing through the ferrite material of phase shifter 66. Accordingly, circular polarizer 64 is included in the passive element 30 of FIG. 6 to produce the necessary circular polarization. The incident energy is therefore phase shifted in phase shifter 66, reflected by reflector plate 67, and phase shifted again upon passage back through the ferrite material of phase shifter 66. The linear polarization of the incident wave is restored in circular polarizer 64 and coupled to ferrite rotator 62 wherein it is compensated for the 90° polarization rotation between the incident energy and the reflected wave. The resultant structure forms a highly efficient phase shifter which produces a large phase shift in a small ferrite volume with low insertion loss and minimum power requirements. For systems wherein circular polarization is desired for transmission and reception the element of FIG. 6 can be greatly simplified since in such a system neither the ferrite rotator 62 nor the circular polarizer 64 will be required.

Figure 10:
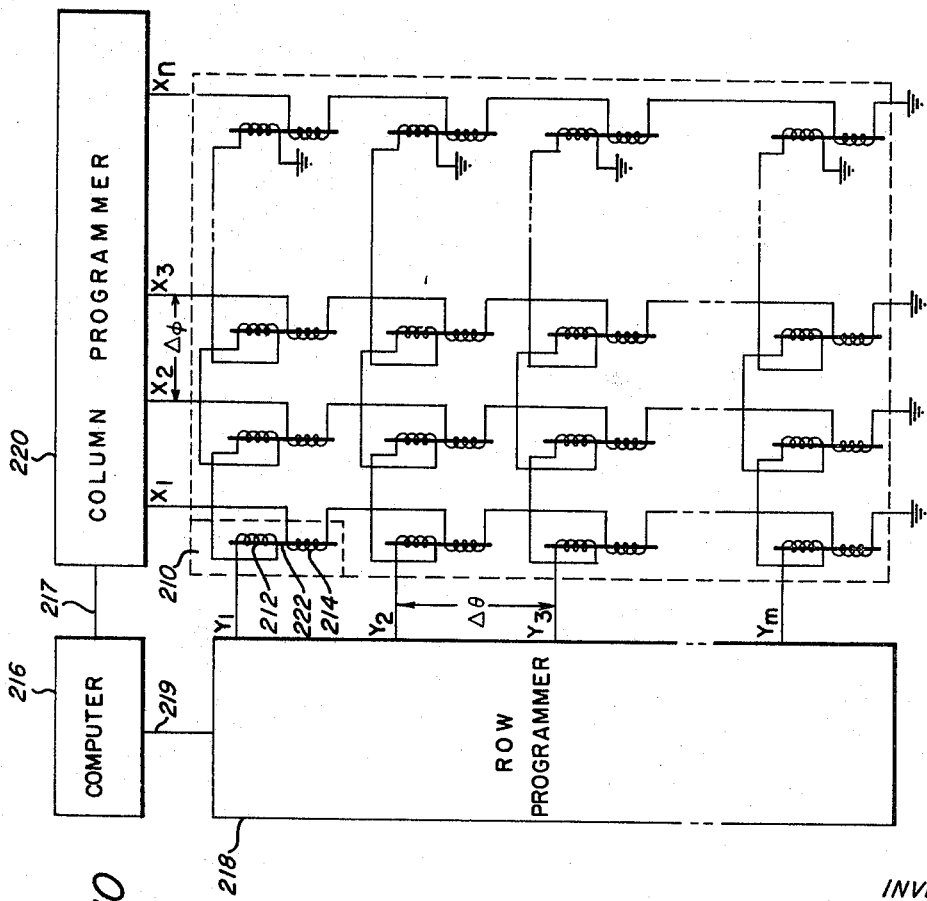
FIG. 10 shows in schematic form a matrix of phase shifters embodying a dual-coil phase shift system of the invention.

By providing two solenoid control coils around the ferrite material of the phase shifter 66 of the embodiment illustrated in FIGS. 4–6, the requisite programming may be greatly simplified as illustrated in FIG. 10. In the apparatus of FIG. 10 the ferrite phase shift elements of the array are depicted in schematic form. One of the elements, enclosed in dotted lines, is designated by the reference numeral 210. A matrix or array of $n$ columns and $m$ rows of these elements are formed. It is to be understood that the array so formed will be employed as shown in FIGS. 1–3 in connection with suitable transmitting or receiving apparatus to collimate and steer a beam of energy toward a desired direction. Each ferrite phase shifting element is provided with two control coils, a $\phi$ coil designated by the numeral 212 and a $\theta$ coil designated by the numeral 214 suitably wound about the ferrite element 222.

Figure 11:
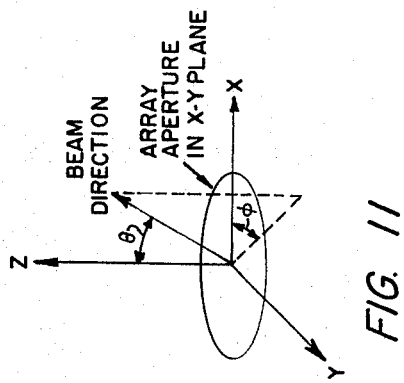
FIG. 11 is a diagram showing the coordinate system used in the equations contained in the description; and, FIG. 12 is a block diagram of a monopulse receiver.

The phase required for each array element to give a beam in the direction $(\theta, \phi)$ is given by the equation:

$$\Phi x, y\ (\theta, \phi) = 2\pi\lambda(x \sin\theta \cos\phi + y \sin\theta \sin\phi)$$

where $(x, y)$ is the position of the element in the $xy$ plane of the array as shown in FIG. 11. This required distribution can be separated into the sum of two basic independent distributions, one dependent upon the $x$ position of the element, and the other on the $y$ position as follows:

$$\Phi x(\theta, \phi) = 2\pi/\lambda x \sin\theta \cos\phi$$
$$\Phi y(\theta, \phi) = 2\pi/\lambda y \sin\theta \sin\phi$$

By summing the two distributions at each matrix as shown in FIG. 10, the number of computations required is reduced since all elements in a given row will require the same $\Phi x$ and all elements in a given column will require the same $\Phi y$. In this manner, the number of separate currents required to move a beam from one direction to another is reduced from $n \times m$ to $n+m$.

Referring again to the apparatus of FIG. 10, computer 216 calculates the phase distribution required to move a beam in the direction $\theta, \phi$. This information is coupled by way of leads 217 and 219 to a column programmer 220 and row programmer 218 respectively. The necessary column and row currents corresponding to the $x$ and $y$ phase distributions of each of the $n \times m$ phase shifter is generated in programmers 218 and 220 and coupled to their respective control coils. For example, the $x_1$ current which is proportional to $$\frac{2\pi}{\lambda}x_1$$

sin $\theta$ cos $\phi$ is coupled from programmer 220 to control coil 214 of ferrite phase shifter 210. In like manner the $y_1$ current proportional to $$\frac{2\pi}{\lambda}y_1$$

sin $\theta$ sin $\phi$ from programmer 218 is coupled to control coil 212 of ferrite phase shifter 210. The two control coils 212 and 214 are wound so as to produce a total phase shift in the ferrite proportional to the sum of the two coil currents. All coils in the $x_1$ column are coupled in series to ground and all coils in the $y_1$ row are coupled in series to ground. Accordingly, it becomes apparent from the aforesaid analysis that by summing the $x$ component and $y$ component of the respective phase shifting elements, the number of current signals required to be programmed to an $n \times m$ array of phase shifting elements in order to move a beam in the direction $\theta, \phi$ is reduced from $n \times m$ to $n+m$, since all elements in a given row require the same $y$ component and all elements in a given column, the same $x$ component. The advantage of this reduction can be best appreciated when concrete representative numbers such as 100 and 50 are substituted for the $n$ and $m$ symbols above. In other words with a 5000 element array comprised of 100 by 50 elements, the number of control currents is reduced from 5000 to 150 by the above described apparatus.

Use of the reduced number of control currents as mentioned above depend, of course, upon having the phase of all the inputs to the elements equal and independent of element position in the array. Because of the geometry of the feed system, however, there are different path lengths to the face of each element from the feed-horn. Thus the elements have to be of varying length to correct for this path length difference. The additional path-length correction portion of each element can be considered as a metal tube lens.

The useful bandwidth of such a metal tube lens is somewhat limited since even if designed for perfect correction at midband, a quadratic phase error over the aperture would occur at the high and low frequencies because of dispersion. If however, the metal tubes of the lens are filled with an appropriate dielectric material such as the dielectric plug 60 of FIG. 6, there is less dispersion, and the resulting bandwidth is increased. By using polystyrene as the dielectric the quadratic phase error at the limits of the frequency band can be reduced to a reasonable value.

Figure 8:
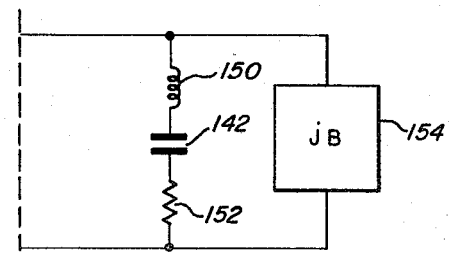
FIG. 8 shows the equivalent circuit for a conjugate arm of the diode phase shifter of FIG. 7 wherein the diode is back-biased.
Figure 9:
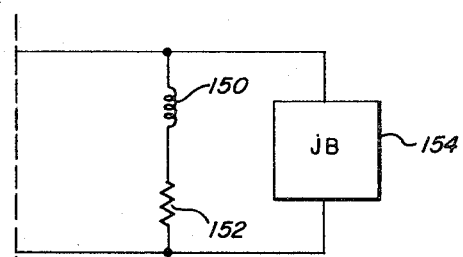
FIG. 9 shows the equivalent circuit for a conjugate arm of the diode phase shifter of FIG. 7 wherein the diode is forward-biased.

In the apparatus of FIG. 7 an alternative embodiment of passive elements utilized in the arrays of FIGS. 1–3 is shown. In this embodiment the passive element comprises one or more diode phase shifters 103 and 123 in cascade connection between an input horn 100 and an output horn 120. Although the apparatus of FIG. 7 is shown in a lens type configuration, a reflector type system is readily obtainable by replacing output horn 120 by a short circuit stub so that power would be reflected back through the circuit of FIG. 7 to the input horn 100 and reradiated. In the apparatus of FIG. 7 the input signal to horn 100 is collected by probe 101 and coupled by coaxial line 125 to an input orthogonal arm 127 of a hybrid 102 which is preferably of a strip transmission line construction. Diodes 104 and 105 shunt the conjugate arms 131 and 132 of hybrid 102. The conjugate arms are permanently terminated by stub lengths or short circuits 106 and 108. The hybrid conjugate arms will be variably terminated in different admittances depending on the bias applied to the diodes from programmer 130. For example, with a forward biasing circuit, the microwave equivalent circuit of conjugate arm 131, is shown in FIG. 9. Thus, under the forward biasing current condition conjugate arm 131 presents the inductance 150 and resistance 152 of the diode 104 in parallel with the susceptance 154 of stub or short circuit 106 to energy coupled through the conjugate arm. With a back-biased diode the equivalent circuit of FIG. 8 is obtained and the reverse bias series capacitance 142 is added to the equivalent circuit of FIG. 9 as shown in FIG. 8. A change in admittance Y results in a change in phase angle $\phi$ as deduced from the well known relationship $$\phi = -\cos^{-1}\frac{G}{|Y|}$$

wherein G equals the conductance of the circuit (Reference P120 Reference Data for Radio Engineers 4th edition). Accordingly, the input energy to diode phase shifter 103 is phase shifted in discrete amounts upon passage through hybrid 102 by switching the bias of diodes 104 and 105 by means of programmer 130 through leads 133 and 135 therein provided. Additional phase shift is obtained by cascading diode phase shifter 103 with additional phase shifters such as diode phase shifter 123 which is substantially identical to diode phase shifter 103 by coupling output orthogonal arm 129 of phase shifter 103 to input orthogonal arm 137 of hybrid 112 by means of coaxial line 110. Programmer 130 provides biasing current to diodes 114 and 115 of phase shifter 123 in a manner similar to that previously described. It is to be understood that any number of phase shifters can be cascaded in this manner within limits determined by the insertion loss of the phase shifting elements. The input signal from horn 100 is incrementally phase-shifted in diode phase shifter 103, additionally phase-shifted an incremental amount at diode phase shifter 123, coupled out of output orthogonal arm 139 to probe 121 and repropagated from horn 120.

The direction of the resultant beam propagated by an array of the passive elements of FIG. 7 optically spaced from a radiant source so as to intercept energy from said source will be determined by the phase shift introduced into the intercepted energy by the individual diode phase shifters.

This completes the description of the antenna array of the invention. However, many modifications thereof will be apparent to those skilled in the art. Accordingly, it is desired that this invention not be limited except as defined by the appended claims.

What is claimed is:

1. In combination:
   an array of passive variable electrical length elements disposed in spaced apart relation from at least one antenna element, each of said passive elements including at least one diode phase shifter means for phase shifting energy incident upon said passive elements, said diode phase shifter means comprising a probe for accumulating incident energy, a four-port hybrid having a pair of conjugate arms and a pair of orthogonal arms, one of said orthogonal arms being coupled to said probe, and variable admittance means in shunt across said conjugate arms.

2. An antenna array system comprising:
   an array of passive variable electrical length elements, each including at least one diode phase shifter means for phase shifting energy incident upon said passive elements, said diode phase shifter means comprising a four-port hybrid having a pair of conjugate arms and a pair of orthogonal arms, and variable admittance means in shunt across said conjugate arms;
   antenna means disposed in spaced apart relation from said array for accepting energy at certain intervals of time and propagating energy at other intervals of time; and,
   means for controlling the collimating and directing of energy from said antenna means during the propagating interval and focusing energy reflected from objects in the path of said propagated energy during the accepting interval comprising means for controlling the electric length of selected variable electric length elements.

3. An antenna array system comprising:
   an array of passive variable electrical length elements, each including at least one diode phase shifter means for phase shifting energy incident upon said passive elements, said diode phase shifter means comprising a probe for accumulating incident energy, a four-port hybrid having a pair of conjugate arms and a pair of orthogonal arms, one of said orthogonal arms being coupled to said probe, and variable admittance means in shunt across said conjugate arms;
   antenna means disposed in spaced apart relation from said array for accepting energy at certain intervals of time and propagating energy at other intervals of time; and,
   means for controlling the collimating and directing of energy from said antenna means during the propagating interval and focusing energy reflected from objects in the path of said propagated energy during the accepting interval comprising means for controlling the electric length of selected variable electric length elements.

4. In combination:
   an array of variable electric length elements;
   antenna means disposed in spaced apart relation from said array for accepting energy at certain intervals of time and propagating energy at other intervals of time, comprising a plurality of horns each spaced apart from a point, and a monopulse receiver including an elevation channel and a reference channel coupled to said horns for providing error signals indicative of the deviation of echo-producing bodies from the projection of said point; and,
   means for controlling the collimating and directing of energy from said antenna means during the propagating interval and focusing energy reflected from objects in the path of said propagated energy during the accepting interval comprising means for controlling the electric length of selected variable electric length elements.

5. In combination:
   an array of variable electric length elements;
   antenna means disposed in spaced apart relation from said array for accepting energy at certain intervals of time and propagating energy at other intervals of time, comprising a plurality of horns each spaced apart from a point, and a monopulse receiver including an azimuth channel and a reference channel coupled to said horns for providing error signals indicative of the deviation of echo-producing bodies from the projection of said point; and,
   means for controlling the collimating and directing of energy from said antenna means during the propagating interval and focusing energy reflected from objects in the path of said propagated energy during the accepting interval comprising means for controlling the electric length of selected variable electric length elements.

6. In combination:
   an array of variable electric length elements;
   antenna means disposed in spaced apart relation from said array for accepting energy at certain intervals of time and propagating energy at other intervals of time, comprising a plurality of horns forming a cluster about a central point, and a monopulse receiver including an elevation channel, an azimuth channel, and a reference channel coupled to said horns for providing error signals indicative of the deviation of echo-producing bodies from the projection of said central point; and,
   means for controlling the collimating and directing of energy from said antenna means during the propagating interval and focusing energy reflected from objects in the path of said propagated energy during the accepting interval comprising means for controlling the electric length of selected variable electric length elements.

7. In combination:
   an array of variable electric length elements;
   antenna means disposed in spaced apart relation from said array for accepting energy at certain intervals of time and propagating energy at other intervals of time, comprising four horns forming a cluster about a central point, and a monopulse receiver including an elevation channel, an azimuth channel, and a reference channel coupled to said horns for providing error signals indicative of the deviation of echo-producing bodies from the projection of said central point; and,
   means for controlling the collimating and directing of energy from said antenna means during the propagating interval and focusing energy reflected from objects in the path of said propagated energy during the accepting interval comprising means for controlling the electric length of selected variable electric length elements.

8. An antenna array system comprising:
   an array of variable electric length elements;
   antenna means disposed in spaced apart relation from said array for accepting energy at certain intervals of time and propagating energy at other intervals of time, comprising four horns forming a cluster about a central point, each producing output signals, and a monopulse receiver including an elevation channel for summing the signals from two pairs of said horns and subtracting the sums, an azimuth channel for summing the signals from two different pairs of said horns and subtracting the sums, and a reference channel coupled to said horns for summing the signals from all of said horns and providing error signals indicative of the deviation of echo-producing bodies from the projection of said central point; and, means for controlling the collimating and directing of energy from said antenna means during the propagating interval and focusing energy reflected from objects in the path of said propagated energy during the accepting interval comprising means for controlling the electric length of selected variable electric length elements.

References Cited by the Examiner

UNITED STATES PATENTS

| | | | |
|---|---|---|---|
| 2,728,912 | 12/1955 | Wells | 343—754 |
| 2,986,734 | 5/1961 | Jones et al. | 343—754 |
| 3,041,605 | 6/1962 | Goodwin et al. | 343—100.6 |
| 3,045,237 | 7/1962 | Marston | 343—754 |
| 3,205,501 | 9/1965 | Kuhn | 343—854 X |

RODNEY D. BENNETT, *Acting Primary Examiner.*

CHESTER L. JUSTUS, *Examiner.*

T. H. TUBBESING, *Assistant Examiner.*